April 24, 1951  J. S. LARKIN  2,550,071
TRENCH DIGGING ATTACHMENT FOR TRACTORS
Filed July 14, 1947  2 Sheets-Sheet 1
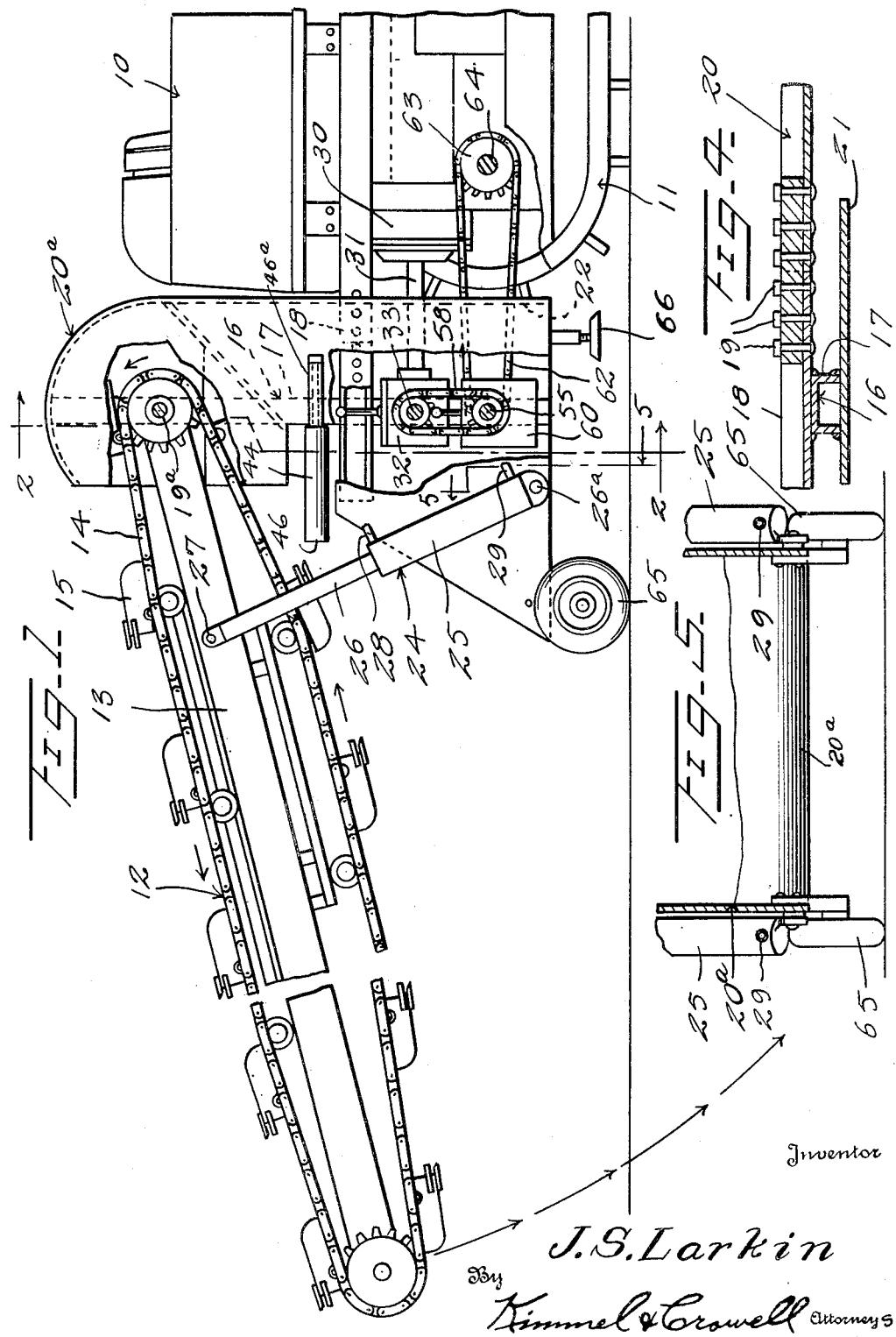
Inventor
J. S. Larkin
By Kimmel & Crowell Attorneys

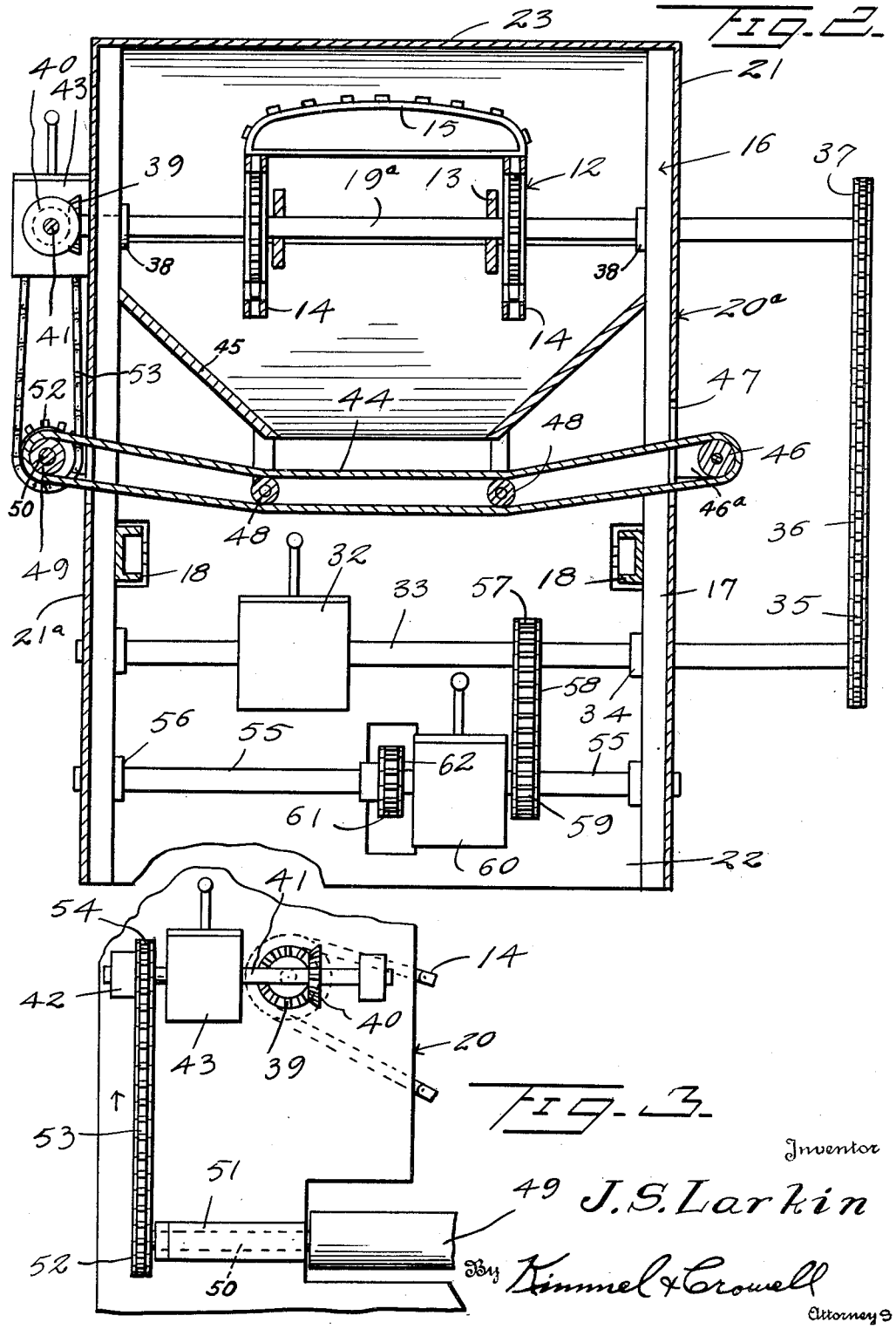

Patented Apr. 24, 1951

2,550,071

UNITED STATES PATENT OFFICE 2,550,071

TRENCH DIGGING ATTACHMENT FOR TRACTORS

Joseph S. Larkin, Dauphin, Pa.

Application July 14, 1947, Serial No. 760,787

2 Claims. (Cl. 37—90)

This invention relates to a trench digging attachment for tractors or the like.

An object of this invention is to provide an attachment of this kind which includes driving means deriving its power from the power take-off and also including power connections for moving the tractor over the ground at selected speeds so that the endless digging means may be moved forwardly at a speed within the capacity of the digging means. In this manner the usual driving means for the tractor are shifted to neutral and the power take-off set in operation. Separate transmissions are provided for both the digger and the tractor driving means so that any desired speed ratio may be obtained in order that the tractor and digger may be moved forwardly at an even speed, depending upon the characteristics of the ground.

Another object of this invention is to provide a trench digging attachment for tractors which is adapted to be secured to the rear of the tractor and which derives its power from the power take-off.

With the above and other objects in view, my invention consists in the arrangement, combination and details of construction disclosed in the drawings and specification, and then more particularly pointed out in the appended claims.

In the drawings,

Figure 1 is a fragmentary side elevation of a trench digging attachment constructed according to an embodiment of this invention and mounted on the rear end of a tractor, Figure 2 is a sectional view, partly broken away, taken on the line 2—2 of Figure 1, Figure 3 is a fragmentary side elevation showing the operative connection between the cross conveyor and the trenching conveyor, Figure 4 is a fragmentary sectional view showing the adjustable connection between the trench digger and the tractor; and Figure 5 is a fragmentary sectional view taken on the line 5—5 of Figure 1.

Referring to the drawings, the numeral 10 designates generally a conventional tractor which in the present instance is formed with an endless or crawler type tread 11. It will be understood that the tractor herein disclosed is only one form of tractor with which the trenching attachment may be connected.

A trenching conveyor generally designated as 12 is adapted to be secured, as will be hereinafter described, to the rear of the tractor 10. The trenching digger includes a swingable frame 13 and a pair of endless chains 14, having digging buckets 15 secured thereto.

A supporting frame generally designated as 16 is adapted to be secured to the rear of the tractor 10 and includes a pair of upright channeled frame members 17 having secured thereto horizontal channel members 18 which are secured by fastening means 19 to horizontal frame members 20 forming part of the tractor frame.

The frame 16 has journaled between the upright frame members 17 thereof a digger shaft 19a which also forms the pivot for the trenching frame members or beams 13. A rearwardly opening hood generally designated as 20a is secured to the frame 16 and comprises side plates 21 and 21a, a forward plate 22, and an upwardly and rearwardly curved top plate 23.

The trenching digger 12 is adapted to be adjusted relative to the vertical by means of a pair of hydraulic adjusting members 24 which include a cylinder 25 pivotally secured as at 26a to the hood 20. The adjusting member 24 also includes a piston rod 26 which is pivotally connected as at 27 to the beam 13. The cylinder 25 is adapted to be connected by means of pipe connections 28 and 29 to a hydraulic pressure means so that the piston rod 26 may be endwise adjusted to provide for vertical adjustment of the trenching digger 12.

The tractor 10 includes a conventional power take-off 30 and a shaft 31 is connected at its forward end to the power take-off 30 and extends rearwardly therefrom. The shaft 31 is connected to a transmission or speed changer 32 and a transverse shaft 33 extends from the transmission 32 and is journaled through a bearing 34 carried by the frame 16. The shaft 33 extends outwardly from the hood 20a and has fixed to its outer end a sprocket 35 about which a chain 36 is trained.

The chain 36 extends upwardly and is trained about a sprocket 37 which is fixed to the upper digging shaft 19a. The shaft 19a is journaled in bearings 38 carried by the frame 16, and the shaft 19a at the end thereof oppositely from the sprocket 37 has fixed thereto a beveled gear 39. The gear 39 meshes with a second beveled gear 40 fixed to a countershaft 41 journaled in bearings 42 carried by the adjacent side wall 21a of the hood 20a.

A transmission 43 may be interposed in the shaft 41 so that a cross conveyor to be hereinafter described may be operated at any selected speed. A cross or transversely disposed conveyor 44 is disposed below the inner or forward end of the conveyor or digger 12, being positioned below a hopper 45 which receives and guides the material from the buckets 15 to the center of the upper side of the transverse conveyor 44. The conveyor 44 is trained about a drum or roller 46 disposed on the outer side of the hood 20a which is rotatably carried by the bearing member 46a fixed to the side wall 21 and the conveyor 44 extends through an opening 47 in the side wall 21.

A pair of idler rollers 48 engage the conveyor 44 between the ends thereof so as to hold the central portion of the cross conveyor substantially horizontal. A second roller or drum 49 engages the opposite end of the conveyor 44, being secured to a drive shaft 50 journaled in bearings 51 and a sprocket 52 is fixed to the shaft 50 and has an endless chain 53 trained thereabout.

The shaft 41 has fixed thereto a sprocket 54 about which the chain 53 is trained so that the shaft 50 will be rotated at a speed determined by adjustment of the transmission 43.

In order to provide for selected forward movement of the tractor 10 when the trenching digger is in operation, I have provided a tractor operating shaft 55 which is journaled in bearings 56 carried by the frame 16. The shaft 33 has fixed thereto a sprocket 57 about which a chain 58 is trained, and the latter is also trained about a sprocket 59 carried by the shaft 55. The shaft 55 has interposed therein a transmission 60 and a sprocket 61 is connected to the transmission 60 in alignment with the shaft 55.

A tractor driving chain 62 is trained about the sprocket 61 and also about a sprocket 63 which is fixed on the shaft 64 at the rear of the tractor 10. The shaft 64 constitutes the normal drive shaft for the tractor 10 and when the trenching device is not in operation the shaft 64 will be operated from the conventional transmission in the tractor coupled to the engine.

The hood 20a has mounted on the rear lower portion thereof a pair of traction wheels 65 which are adapted to movably support the rear of the attachment during the digging operation. The hood 20a is also adapted to be supported when uncoupled from the tractor 10 by means of extendible jack members 66 carried by the forward lower portion of the hood 20a.

In the use and operation of this device, the frame 16 with the hood 20a are fixed to the rear of the tractor 10 by the fastening means 19. The shaft 31 is coupled to the power take-off and the fluid connections 28 and 29 are connected to the hydraulic pressure means normally carried by the tractor. When the trenching digger 12 is in digging position, the rear free end thereof will be disposed below the line of travel of the tractor. The angular position of the trenching digger 12 is adjusted to provide for the desired depth of trench which is to be dug by this device.

The shaft 19a is rotated at the desired speed by adjustment of the transmission 32. The tractor 10 has the usual transmission thereof disposed in a neutral position and the forward movement of the tractor 10 is obtained through the driving chain 62. This chain is operated by the shaft 55 which is coupled by the chain 58 to the shaft 33. The chain 62 is operated at a selected speed by adjustment of the tractor operating transmission 60. Through the use of this latter transmission the tractor may be progressively moved forward at any selected ratio or speed, depending on the character of the ground or strata which is being dug by the trenching member 12.

I do not mean to confine myself to the exact details of construction herein disclosed but claim all variations falling within the purview of the appended claims.

What I claim is:

1. In combination with a tractor having a power take-off and a drive shaft for the traction means thereof; a trench digging attachment comprising a mobile frame, means removably securing said frame to the rear end of said tractor; a first transverse shaft journalled in said frame, driving means for said first shaft including rotatable means secured to said power take-off and a speed changing transmission means operatively interposed between said first shaft and said rotatable means; a second transverse shaft journalled in said frame above said first shaft, a boom having one end pivotally carried by said second shaft, an endless digging member carried by said boom, means fixed on said second shaft and engaging said digging member for driving the latter; driving connections between said first and second shafts, transversely extending endless conveyor means disposed below said one end of said boom and adapted to receive the material discharged from said digging member, said conveyor means including a pair of rollers disposed on opposite sides of said frame and rotatably carried thereby, and an endless belt trained over said rollers, driving connections between said second shaft and one of said pair of rollers, said latter driving connections including speed changing means; a third shaft journalled in said frame and disposed below said first shaft, driving connections between said third and first shafts, operating connections between said third shaft and said drive shaft for driving the traction means of said tractor whereby the relative speeds of said power take-off, said digging member and said conveyor means may be adjusted and controlled.

2. The device set forth in claim 1 wherein said third shaft includes a pair of axially aligned stub shaft portions rotatable relative to each other, said driving connections between said third and first shaft engaging one of said pair of stub shaft portions for causing rotation thereof, speed changing transmission means operatively disposed between said pair of shaft portions, and wherein said operating connections extend from the other of said pair of shaft portions to said tractor drive shaft whereby the speeds of said power take-off, said digging member, and said conveyor means relative to each other and relative to said tractor drive means may be controlled and adjusted.

JOSEPH S. LARKIN.

REFERENCES CITED

The following references are of record in the file of this patent:

UNITED STATES PATENTS

| Number | Name | Date |
|---|---|---|
| 1,278,454 | French | Sept. 10, 1918 |
| 1,806,511 | Vaughn | May 19, 1931 |
| 1,856,216 | Jaeger | May 3, 1932 |
| 1,917,508 | De Wind | July 11, 1933 |
| 2,231,983 | Zuckerman | Feb. 18, 1941 |